Sept. 22, 1959  H. B. VINCENT  2,905,845
FULL VISION CATHODE RAY TUBES
Filed Sept. 27, 1955  2 Sheets-Sheet 1
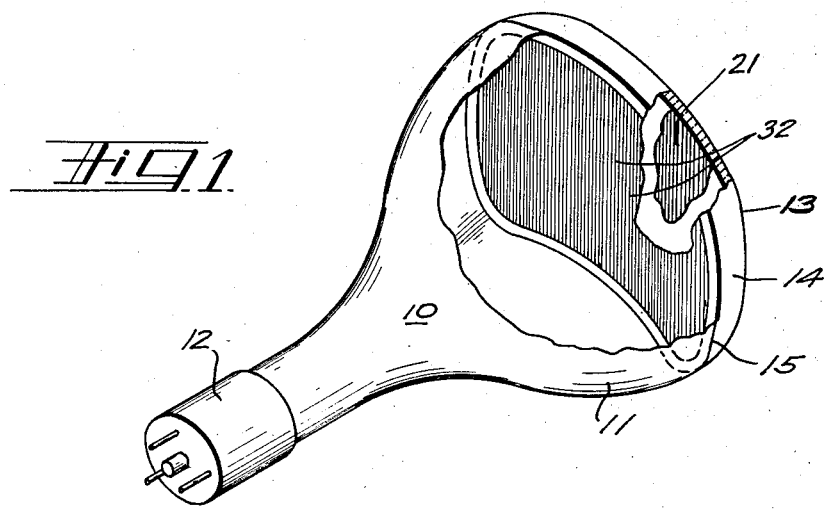
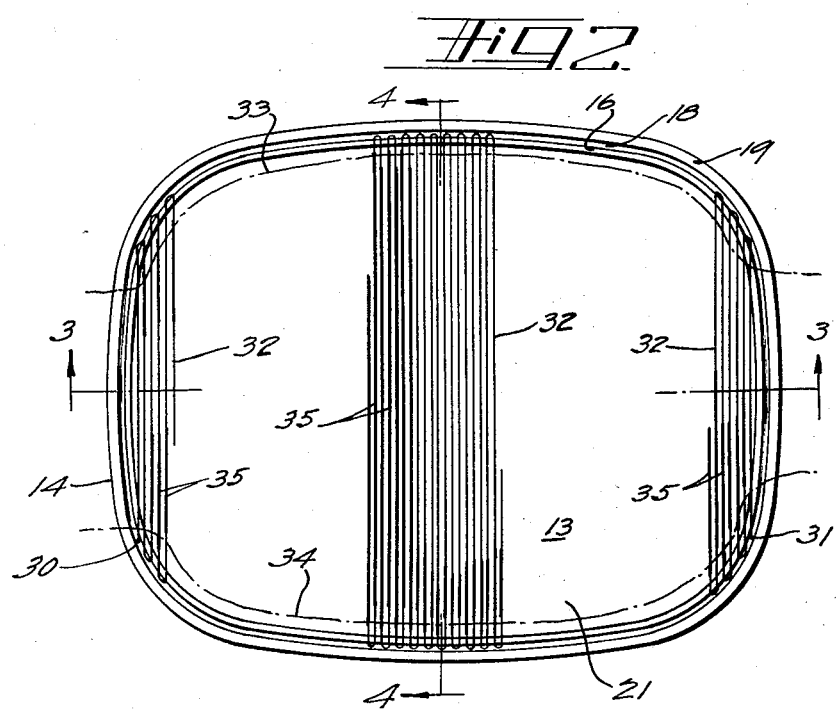
INVENTOR
HARVARD B. VINCENT
BY W. A. Schaich
Leonard D. Doubles
ATTORNEYS Sept. 22, 1959  H. B. VINCENT  2,905,845
FULL VISION CATHODE RAY TUBES
Filed Sept. 27, 1955  2 Sheets-Sheet 2
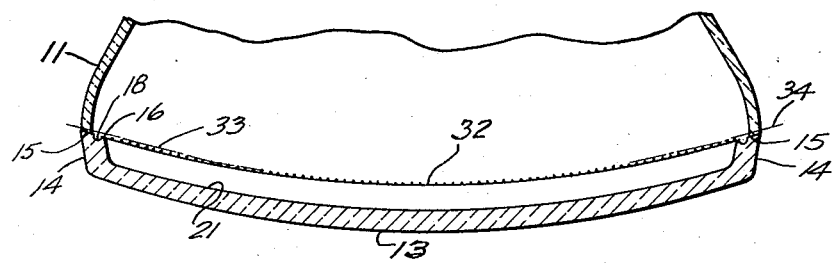
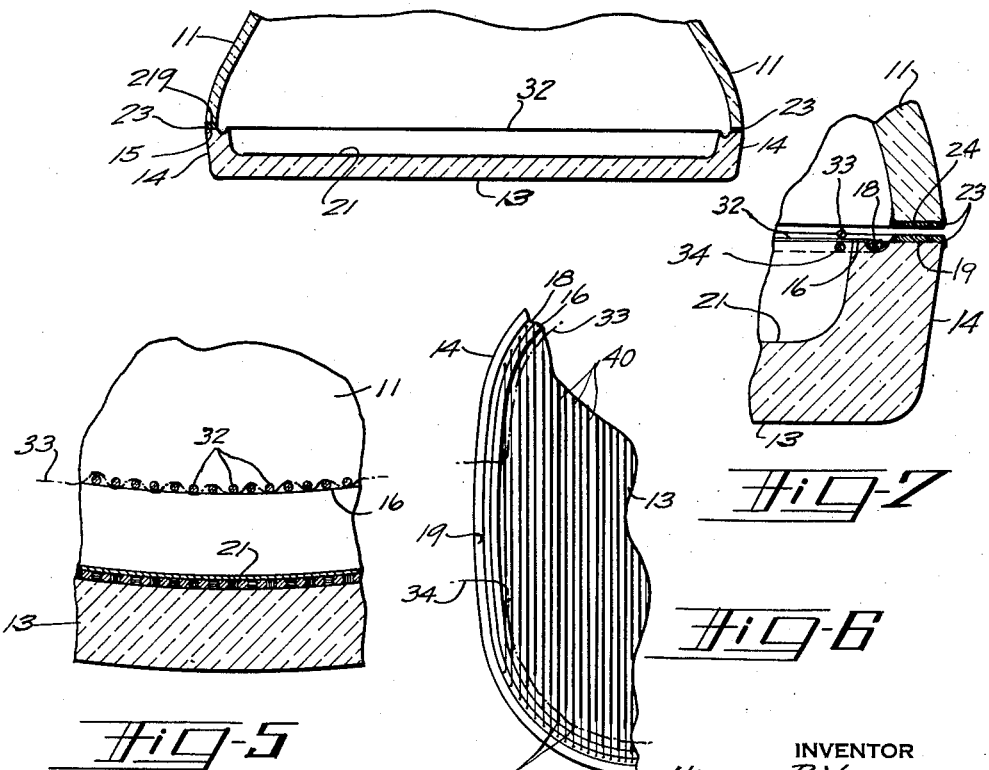
INVENTOR
HARVARD B. VINCENT
BY
ATTORNEYS

United States Patent Office

2,905,845
Patented Sept. 22, 1959

2,905,845

FULL VISION CATHODE RAY TUBES

Harvard B. Vincent, Toledo, Ohio, assignor to Owens-Illinois Glass Company, a corporation of Ohio Application September 27, 1955, Serial No. 536,917

3 Claims. (Cl. 313—78)

The present invention relates to cathode ray tubes and more particularly to an improved full vision cathode ray tube capable of permitting viewing of either monochromatic and/or polychromatic television images. The subject tube consists of a hermetically sealed glass envelope comprising the necessary mechanism for a color television picture tube and having a more extensive viewing window for image formation.

This invention provides a composite glass face plate for tube fabrication and which functions as a combined viewing window, image screen, and color controlling element of simplified construction. This multi-purpose glass member is especially adapted for use with the Lawrence or Chromatic type picture tubes designed to reproduce colored television images such as described in the Lawrence Patent No. 2,653,263, issued on September 22, 1953.

In present practice the color control apparatus for recreating colored images consists of a separate color mask or grid assembly located within the tube adjacent to its internal target surface. In both the Lawrence and Chromatic type tubes, it is common practice to provide a grid frame within the tube said grid mounting a plain glass plate as a target surface having luminescent phosphors deposited thereon in a prescribed pattern. A color control grid of parallel wires comprising several circuits is also mounted on the grid frame and positioned adjacent and parallel to this target surface to focus the tube electron beam upon designated areas of the target phosphors. The electron beams are directed from electron guns through the control grid to sweepingly impact the target surface prior to its striking the phosphors. This separate grid which has heretofore been fabricated upon a separate frame assembly is located near the target in the front area of the tube and this frame structure within the tube reduces the maximum dimensions of the obtainable image to an area less than the internal size of the grid frame itself. Thus, the full area of the tube viewing window cannot be utilized without providing a different type grid as well as a different manner of mounting for the grid.

It is an object of the present invention to provide a structure for a color picture tube which is of simple construction and which provides the fullest possible area of image viewing on the face of the tube.

It is a further object of this invention to provide a color picture tube wherein the screen and control grid are mounted directly upon one of the glass members to form an individual unit.

It is still another object of this invention to provide a color picture tube wherein the physical characteristics of the grid member are in suitable agreement with those of the glass member to improve their durability and simplify their fabrication.

A still further object is to provide a single unitary member which is a combination face plate, target and grid and which can be prefabricated and then sealed to a complementary glass member to form a composite television tube.

In general the present invention consists of the combination of a glass bulb having a curved face plate and a parallel curved grid as required by the type of television presentation to be used. In addition, the phosphors for emitting light of appropriate colors are deposited directly upon the inner surface area of the face plate portion of the tube. The structure of the tube is simple and follows conventional all-glass cathode ray tube lines, the present departure being in forming inner edge surface areas of the face plate in such a manner as to accommodate mounting of the grid elements directly thereon. The phosphors on the face plate may be deposited thereon in any one of several ways such as screen printing, photographically, or otherwise. Many phosphors which fluoresce in the desired colors are known in the art and are not the subject of this invention.

Referring to the accompanying drawings:

Fig. 1 is a perspective view of a color picture tube which incorporates a line grid adjacent to the screen;

Fig. 2 is a rear view of the face of the tube illustrating a line grid in the form of a single fiber or wire extending through the full width and height of the viewing portion of the tube face;

Fig. 3 is a part-sectional view taken at line 3—3 on Fig. 2 and illustrates the line grid as following the curved contour of the tube face;

Fig. 4 is a part-sectional view taken at line 4—4 on Fig. 2 and illustrates the line grid as parallel to the tube face and screen;

Fig. 5 is an enlarged part-sectional view taken along the longitudinal axis of the tube showing in detail the relationship between the grid strands and the color phosphor strips;

Fig. 6 is a part rear view showing the grid lines or strands as individual fibers or wires; and Fig. 7 is an enlarged part-sectional view of the joined edges of the tube funnel and face plate.

One form of my invention is illustrated in Fig. 1 as a cathode ray tube 10 shown as an evacuated sealed hollow glass envelope. The cathode ray tube 10 is typical of a picture tube suitable for either black and white or colored television reception and incorporates features which make it particularly valuable for the reception of the latter. The tube 10 is comprised of a glass funnel 11 and glass face plate 13 which in their finally assembled form, are hermetically sealed together as at 15. The neck portion of the funnel 11 may be sealed by the metallic beam gun 12 which may constitute either a single or multiple electron source for the tube 10.

The funnel 11 and face plate 13 are individually fabricated and later hermetically joined at their matching edges 24 and 19 respectively, in the area of the greatest dimensions 15 of the generally conically shape funnel. The face plate 13 is illustrated as having a generally rectangular shape, but it may also be provided in circular shape. The face plate 13 consists of a hollow curved glass member with its viewing surface formed in the shape of a segment of a cylindrical wall, and is provided with side walls or a flange portion 14 having the same generally rectangular shape of the above-mentioned funnel 11. This annular flange 14 which extends completely around the perimeter of the viewing surface extends a uniform distance away from the cylindrical shaped face plate 13 and provides thereby, a sealing edge 19 spaced from the phosphor coated area 21 of the face plate. The flange 14 has a sealing surface area 19, the external dimensions of which are in suitable agreement to match the external dimensions of the sealing edge 21 of the funnel 11 and both of these sealing edges are precoated with a low temperature melting composition.

The funnel 11 and face plate 13 are sealed together at their matching edges 19 and 24 which have the same external contour by this low temperature sealing composition 23, such as a solder glass which will soften to fuse the parts together at a lower temperature than will cause deformation or damage to the glass parts. Such sealing compositions which have been disclosed in a copending patent application, Serial No. 554,753, filed December 22, 1955, entitled "Low-Temperature Glass Sealing Composition" and assigned to a common assignee, now abandoned, have physical properties compatible with those of the hard glass parts. Their coefficients of thermal expansion and contraction are in such agreement with those of the glass parts that a controlled stress joint may be obtained in sealing together the funnel 11 and face plate 13. These sealing compositions which may be designated as solder glasses, are adapted for softening temperatures below the annealing temperatures of the hard glass parts.

The sealing edge portion 19 of the flange 14 is sealed to the similarly curved edge 24 of the funnel 11. An internal land or edge portion 16 coaxial with the cylindrical, phosphor coated area 21 of the face plate is formed upon the inner wall of flange 14 and between the internal land portion 16 and the sealing edge 19, is located a depression or recess 18. The edge portion 16 serves to locate the grid members 32 and 40 in parallel and equidistant from the phosphor coating 21, and the recess 18 serves as the grid member retaining means when said members are cemented or fastened therein in some desirable manner. These grid members 32 and 40 may be fastened in the groove 18 by means of an adhesive, such as Saureisen cement or a low temperature melting composition of glassy nature. However, whichever material is used, it must be of a type not affected by the temperatures required to seal the face plate 13 and funnel 11 together.

Referring in particular to Fig. 2, there is illustrated a combination face plate and grid structure wherein the grid strand 32 is composed of a continuous element of an electrical insulating material such as a glass fiber anchored at 30 along the edge 16 and in the recess 18. This grid strand is then strung vertically back and forth through the width of the face plate 12 to finally end at 31 on the opposite side of the face plate. This continuous strand is fastened in the groove 18 either through the use of the mentioned Saureisen cement or some glassy composition having a melting temperature in excess of that composition used in sealing together the edges 19 and 24 of the face plate 13 and the funnel member 11. This continuous strand 32 may then be masked in such manner that the alternate and intermediate parallel strands will have conductive coatings 35 imposed thereon. The coating on the alternate strands is of sufficient length to be only in contact with a terminal means 33, while the coating on the intermediate strands will be of such length as to contact only the opposite terminal member 34, thus providing the plurality of circuits required for control of color beam projection. The conductive coating 35 on the parallel portions of the strand thus ends short of either the terminal means 33 or the terminal means 34 to thus insure the separate circuits.

In Fig. 6 there is shown a different arrangement in which the grid strands 40 are each separate and distinct strands, with the ends of each anchored in the groove 18 and on oppositely disposed walls or flange 14 of the face plate 12. In this particular instance each strand is provided with a conductive coating 41 and on each alternate strand this said coating ends short of contact with the terminal means 33 or 34, thus insuring the separate or plurality of circuits required.

In Fig. 7 the funnel member 11 and the face plate 14 are illustrated as having their sealing edges 19 and 24 coated with a sealing composition 23. In this same view the parts are shown as superimposed over each other and ready to be brought into contact for sealing in final assembly (as shown in Fig. 1). Thus, when all of the mechanisms required for final tube operation, are assembled in the funnel 11 and face plate 13, there two members are superimposed, as in Fig. 7, and the edges 19 and 24 with their coating 23, are subjected to a temperature sufficient to soften coating 23, but below the deformation temperature of the glass, thereby causing a fusion of these coated edges. The tube is simultaneously vacuumized and sealed.

Modifications may be resorted to within the spirit and scope of the appended claims.

I claim:

1. A color television picture tube comprising an evacuated envelope, said envelope comprised of at least two glass parts, said glass parts being hermetically sealed together with a low temperature sealing composition, one of said glass parts comprising a cylindrically-curved viewing portion bounded by an annular flange, an emissive screen imposed upon the curved inner surface of the viewing portion of said tube, gun means within said tube disposed opposite to said viewing surface and adapted for projecting beams of electrons to said screen, a curvilinear grid of fine glass strands interposed between said screen and gun means adjacent and parallel to the former, said strands being adapted to be electrically conductive on their surface areas and through portions of their length, said strands being sealed directly to the inner side walls of the annular flange of said glass viewing portion with a low-melting glass sealing composition, and said strands having a coefficient of expansion and contraction paralleling those of the glass of said glass parts.

2. As an article of manufacture, the face plate of a glass television tube, said face plate comprised of a viewing portion and depending side wall portions, the viewing portion and the open sealing edge of the side walls thereof being of curved contour through their width, said face plate having a grid formed of fine strands of glass fiber directly sealed to opposite inner side walls thereof, the sealing joint between said strands and the said side walls paralleling the said curved contour of said face plate and said open sealing edge and the open sealing edge of said face plate having a low temperature sealing composition thereon.

3. As an article of manufacture, the face plate of a glass television tube, said face plate comprised of a viewing portion and depending side wall portions, the viewing portion and the open sealing edge of the side walls thereof being of curved contour through their width, said face plate having a grid formed of fine strands of glass fiber directly sealed to oppositely disposed side walls thereof, the sealing joint between said strands and said side walls of said viewing portion paralleling the said curved contour and the sealing composition for the fibers having a melting point in excess of the face plate sealing composition.

References Cited in the file of this patent

UNITED STATES PATENTS

| | | |
|---|---|---|
| 2,690,518 | Fyler et al. | Sept. 28, 1954 |
| 2,721,288 | Vale | Oct. 18, 1955 |
| 2,728,021 | Banks | Dec. 20, 1955 |
| 2,729,760 | Lawrence | Jan. 3, 1956 |
| 2,736,832 | Zaphiropoulos | Feb. 28, 1956 |
| 2,757,303 | Silverman | July 31, 1956 |
| 2,793,317 | Lawrence | May 21, 1957 |
| 2,813,213 | Cramer | Nov. 12, 1957 |